UNITED STATES PATENT OFFICE.

EUGÈNE G. RESSENCOURT, OF ST. LOUIS, MISSOURI, ASSIGNOR TO ELIOT H. CHAMBERLAIN, TRUSTEE, OF ST. LOUIS, MISSOURI.

PROCESS OF MAKING STRAWBERRY AND RASPBERRY EXTRACT.

1,001,556.     Specification of Letters Patent.     Patented Aug. 22, 1911.

No Drawing.     Application filed January 3, 1911. Serial No. 600,589.

*To all whom it may concern:*

Be it known that I, EUGÈNE G. RESSENCOURT, a citizen of the United States, residing at the city of St. Louis, State of Missouri, have invented a certain new and useful Process of Making Strawberry and Raspberry Extracts, of which the following is such a full, clear, and exact description as will enable any one skilled in the art to which it appertains to make and use the same.

My invention relates to a process of making strawberry or raspberry extract, and its particular object is to produce an extract that will be highly concentrated and will have the characteristics of the fresh fruit as to flavor and perfume. In a general way the process is similar to the process of making fruit extracts described in my application, Serial No. 589,131, filed October 26, 1910.

In my process I first thoroughly crush a mixture of the fresh fruit and an approximately equal quantity of high grade crystallized sugar and then add cologne spirit which I have found to be the most suitable solvent of the aromatic substances which I desire to separate from the fruit. I prefer to use sugar in the form of large crystals for the reason that the principal purpose of the sugar is to assist in crushing and separating parts of the berries and the sugar crystals as they are being broken up satisfactorily perform this function. The fact that the sugar ultimately dissolves and that its presence really adds to the commercial value of the extract makes it a particularly valuable means for the purpose mentioned. I wish it to be understood, however, that the use of sugar in any form, while desirable, is not absolutely essential to the production of a satisfactory extract nor is it essential that the proportion of sugar set forth be used, that amount merely having been found to be preferable.

The mixture is allowed to stand a few days and is then subjected to distilling action by means of which the aromatic substances are separated from the fruit and carried over with the cologne to the condenser. I have found that in beginning the extraction the mixture should be heated very gradually and that a suitable temperature to be maintained during the process of extraction is about 200° Fahr. Care must be taken that none of the fruit is burned since this would impair the quality of the extract, and to prevent this I usually place the crushed fruit in a perforated strainer suspended within the retort or container. This prevents the fruit from coming into contact with the bottom or sides of the vessel.

The distilling action should be continued until the volume of the moisture is reduced to about one-half of its original volume. The residue which contains the sugar, the coloring matter of the fruit, and some undistilled spirit, is then strained preferably through a double linen cloth and after cooling is added to the distillate. The result is a highly concentrated extract that corresponds to the fruit in color, flavor and aroma. I have found, however, that in making strawberry or raspberry extract it greatly improves the quality of the product as to delicacy and permanence of the aroma and its exact correspondence to the fruit to add grape spirit and angelica wine. This is preferably done at the same time the cologne spirit is added.

I will now give a particular example of the details of my process when applied to making strawberry extract:

First I take about six gallons of clean berries, which however should not have been washed and cut them into small pieces and add an approximately equal quantity by weight or about sixty pounds of rock candy which should preferably be broken into coarse pieces. The berries and the rock candy are then ground together in a mortar under a strong pressure until the rock candy is dissolved. To this mixture I then add one-half the quantity by volume or about six gallons of cologne spirit and one-fourth of the quantity by volume or about three gallons of pure grape spirit and a like amount of angelica wine. I then prefer to place this mixture in a glass container and allow it to stand for at least a week. The whole mixture is then subjected to distilling action and distillation is carried on at a temperature ranging from about 170° to 200° Fahr. until the volume of the mixture has been reduced about one-half. The residue is then strained and mixed with the distillate.

Having fully described my invention, what I claim as new and desire to secure by Letters Patent of the United States is:

1. The process of making strawberry or raspberry extract which comprises mixing a solvent of aromatic substances, grape spirit and angelica wine with the fruit and subjecting the mixture to distilling action, substantially as described.

2. The process of making strawberry or raspberry extract which comprises mixing cologne spirit, grape spirit and angelica wine with the fruit and subjecting the mixture to distilling action, substantially as described.

3. The process of making strawberry or raspberry extract which comprises crushing a mixture of sugar crystals and the whole fruit, adding cologne spirit, grape spirit and angelica wine, and subjecting the mixture to distilling action.

4. The process of making strawberry or raspberry extract which comprises crushing a mixture of rock candy and the whole fruit, adding cologne spirit, angelica wine and grape spirit, subjecting the mixture to distilling action at a temperature of about 200° Fahr. until the volume is reduced about one-half, straining the residue and adding it to the distillate.

In testimony whereof, I have hereunto set my hand and affixed my seal in the presence of the two subscribing witnesses.

EUGÈNE G. RESSENCOURT. [L. S.]

Witnesses:
 E. E. HUFFMAN,
 ELIZABETH BAILEY.

Copies of this patent may be obtained for five cents each, by addressing the "Commissioner of Patents, Washington, D. C."